United States Patent [19]

Hoffman et al.

[11] 4,421,211
[45] Dec. 20, 1983

[54] CONNECTION MECHANISM FOR AUTOMATIC SLACK ADJUSTER

[75] Inventors: Fred W. Hoffman, Brunswick; Raphael A. Barrios, Elyria, both of Ohio

[73] Assignee: The Bendix Corporation, Southfield, Mich.

[21] Appl. No.: 963,252

[22] Filed: Nov. 24, 1978

Related U.S. Application Data

[63] Continuation of Ser. No. 841,266, Oct. 12, 1977, abandoned.

[51] Int. Cl.³ .............................................. F16D 65/52
[52] U.S. Cl. ............................... 188/79.5 K; 285/305; 403/326; 403/379
[58] Field of Search ................. 188/72.9, 79.5 K, 321, 188/329, 330, 332, 338, 339; 403/324, 326, 378, 379, DIG. 7; 285/305

[56] References Cited

U.S. PATENT DOCUMENTS

| 965,131 | 7/1910 | Bliss | 403/379 |
|---|---|---|---|
| 1,357,042 | 10/1920 | Gairing | 403/379 |
| 2,672,924 | 3/1954 | Anthes | 403/325 |
| 3,507,369 | 4/1970 | Oliver | 188/79.5 K |
| 3,526,303 | 9/1970 | Lodjic et al. | 188/79.5 K |
| 3,973,791 | 8/1976 | Porta et al. | 285/305 |

FOREIGN PATENT DOCUMENTS 1810347 9/1970 Fed. Rep. of Germany ...... 285/305

*Primary Examiner*—George E. A. Halvosa
*Attorney, Agent, or Firm*—Ken C. Decker; William N. Antonis

[57] ABSTRACT

An automatic slack adjuster for a vehicle braking system includes a yoke assembly which is pivotally mounted on the adjuster body and in which is adapted to be connected to a push rod actuated by a fluid pressure actuator. The yoke assembly includes a recess having an entrance which is adapted to receive the end of the push rod. An adapter member is threaded on the end of the push rod received in the recess, and a U-shaped connector penetrates the body of the yoke to engage a circumferentially extending groove on the adapter, to thereby define a nonthrust transmitting connection between the yoke and the push rod. The yoke assembly defines a pair of thrust receiving surfaces which circumscribe the entrance to the recess, and a thrust washer slidable on the push rod is held at a thrust transmitting engagement with one of the thrust receiving surfaces by a nut which is threaded on the end of the push rod. The adapter is stepped to define larger and smaller surfaces with a shoulder therebetween which is adapted to engage the other thrust transmitting surface. Consequently, braking thrust is exerted on the yoke assembly through the push rod, the thrust washer, and the one thrust receiving surface, but if the thrust washer is moved out of thrust-transmitting engagement with the one surface, thrust may be transmitted to the other surface through the shoulder.

6 Claims, 7 Drawing Figures

CONNECTION MECHANISM FOR AUTOMATIC SLACK ADJUSTER

This is a continuation of application Ser. No. 841,266, filed Oct. 12, 1977, now abandoned.

BACKGROUND OF THE INVENTION

This invention relates to a mechanism for effecting a connection between the push rod actuated by a fluid pressure actuator and a yoke assembly carried on a slack adjuster in a vehicle fluid pressure braking system.

Modern fluid pressure braking system for heavy duty trucks include a pneumatic actuator, which is communicated to an air pressure source when a brake application is effected, a push rod, which transmits movement of the fluid pressure actuator, and a slack adjuster, which transmits linear motion of the push rod into rotary motion for actuating the vehicle cam actuated brakes. More recently, slack adjusters having a mechanism which automatically effects brake adjustment when the clearances between the brake shoes and the brake drum become too great have been introduced. These automatic slack adjusters include a yoke assembly which is pivotally connected to the lever which effects the brake application and to an adjusting linkage which effects the automatic adjustment operation. The yoke assembly is connected to the push rod which transmits the movement of the aforementioned fluid pressure actuator. However, assembly of automatic slack adjusters to the push rods has been quite time-consuming, particularly in view of the fact that automatic slack adjusters are commonly mounted in very tight spaces, and use push rods which are relatively short. It is therefore highly desirable to provide a mechanism which can effect the connection between the actuator push rod and the yoke assembly carried by the slack adjuster in a minimum amount of time and in a relatively simple and effective manner.

SUMMARY OF THE INVENTION

Therefore, an important object of our invention is to provide a mechanism which effects the connection between a push rod and yoke assembly of an automatic slack adjuster in a less time-consuming and more efficient manner than those mechanisms known to the prior art.

Another important object of our invention is to provide an automatic slack adjuster which connects with the actuator push rod through a mechanism having both thrust transmitting and nonthrust transmitting connections.

Still another important object of the invention is to provide a connection between an automatic slack adjuster and an actuator push rod which is fail-safe, so that braking forces can be assured of being transmitted to the slack adjuster when a brake application is effected.

DESCRIPTION OF THE DRAWINGS

FIG. 1 is a fragmentary plan view, partly in section, of a cam actuated brake having an automatic slack adjuster;

FIG. 2 is a view taken substantially along lines 2—2 of FIG. 1 and illustrating a mechanism made pursuant to the teachings of the present invention for connecting the slack adjuster yoke assembly and the actuator push rod, the various components being illustrated in positions which they assume just prior to connection of the push rod to the yoke assembly;

DETAILED DESCRIPTION

Figure 4:
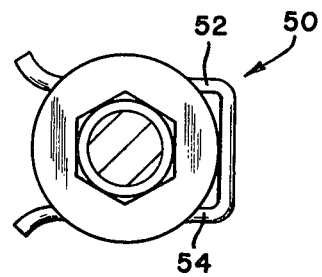
FIG. 4 is a view taken substantially along lines 4—4 of FIG. 3.

Referring now to FIG. 1 of the drawings, a cam actuated brake assembly generally indicated by the numeral 10 includes a drum 12 which is mounted for rotation with a vehicle wheel, and a pair of brake shoes 14, 16 which are yieldably urged away from the drum 12 by a return spring 18. A cam 20 is mounted on a cam shaft 21 and is disposed between contiguous ends of the brake shoes 14 and 16. Upon rotation of the cam shaft 21, the cam 20 rotates to urge the shoes 14 and 16 apart and into braking engagement with the drum 12 in a manner well known to those skilled in the art. An automatic slack adjuster generally indicated by the numeral 22 includes a lever 24 which is mounted on the cam shaft 21, and is adapted to rotate cam shaft 21 when the lever 24 is rotated. The automatic slack adjuster 22 further includes a yoke assembly 26 which connects with an actuator push rod 28 which transmits motion of a fluid pressure actuator (not shown) which is well known to those skilled in the art and will not be described in detail herein. The lever 24 transmits the linear motion of the push rod 28 into rotary motion of the cam shaft 21. The yoke assembly 26 is pivotally connected to the lever 24 as at 30 and is also pivotally connected to a linkage assembly 32. The linkage assembly 32 is part of the automatic adjustment mechanism for the slack adjuster 22, and is effective upon movement of the shoes 14 and 16 in an excessive amount during the brake application to index the brake release position of the shoes 14, 16 so that they are closer to the drum 12, thereby maintaining the released clearance of the brake shoes 14 and 16 with respect to the drum 12 at a substantially constant amount. The slack adjuster 22 may be of the type described in U.S. Pat. No. 3,901,357, owned by the assignee of the present invention, and incorporated herein by reference.

Figure 3:
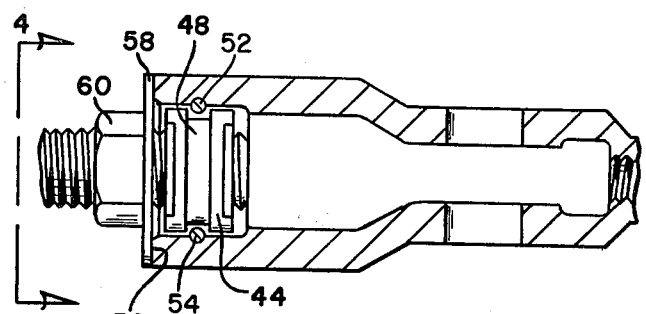
FIG. 3 is a view similar to that of FIG. 2 showing the various components of the connecting mechanisms in the positions which they assume after the push rod has been secured to the yoke assembly.

The push rod 28 is normally connected to the yoke assembly 26 after both the push rod 28, the aforementioned fluid pressure actuator (not shown), and the automatic slack adjuster mechanism 22 are already mounted on the vehicle. It will readily be appreciated by those skilled in the art that the connection between the push rod 28 and the yoke assembly 26 can sometimes be quite difficult, particularly in installations in tight spaces where the length of the push rod 28 is relatively short. Referring now to FIGS. 2–4, the connection mechanism of the present invention will be described in detail. The yoke assembly 26 terminates in an enlarged portion 34 which defines a recess 36 therewithin having an open end 38 which is adapted to receive the push rod 28. A pair of openings 40, 42 penetrate the portion 34 of the yoke assembly 26, and intersect the edges of the recess 36. An adapter 44 is threadedly connected to the end of the push rod 28, which is provided with threads as at 46. The adapter 44 has a circumferentially extending groove 48 provided therein which intersects the openings 40 and 42 when the end of the push rod 28 is installed within the recess 36 as best illustrated in FIG. 3. A generally U-shaped clip generally indicated by the numeral 50 defines a pair of legs 52, 54 which are adapted to be received in the openings 40 and 42. Again, as illustrated in FIG. 3, the end of the push rod 28 carrying the adapter 44 is installed in the opening 36, with the groove 48 aligned with the openings 40, 42. The legs 54, 52 of the clip 50 are then inserted in the openings 40, 42, so that they engage the groove 48 and thereby provide a nonthrust transmitting connection between the yoke assembly 26 and the push rod 28. The ends of the legs 52, 54 are deflected outwardly as best illustrated in FIG. 4 after the clip 50 is installed on the yoke assembly 26, to prevent the clip 50 from being knocked or vibrated out of position.

The yoke 26 defines a thrust receiving surface 56 which circumscribes the entrance 38 into the recess 36. A thrust washer 58 is slidably mounted on the push rod 28, and a conventional nut 60 is threadedly engaged with the threads 46. After the adapter 44 and clip 50 are installed as described hereinabove and as illustrated in FIG. 3, the thrust washer 58 is brought in engagement with the thrust receiving surface 56, and the nut 60 tightened to hold the thrust washer 58 snugly against the surface 56 and to also take up the axial clearance between the legs 52, 54 of the clip 50 and the groove 48. When this axial clearance is taken up, there will still be a small clearance between the left hand end of the adapter 44, viewing FIG. 3, and the thrust washer 58.

DETAILED DESCRIPTION OF THE FIRST ALTERNATE EMBODIMENT

Figure 5:
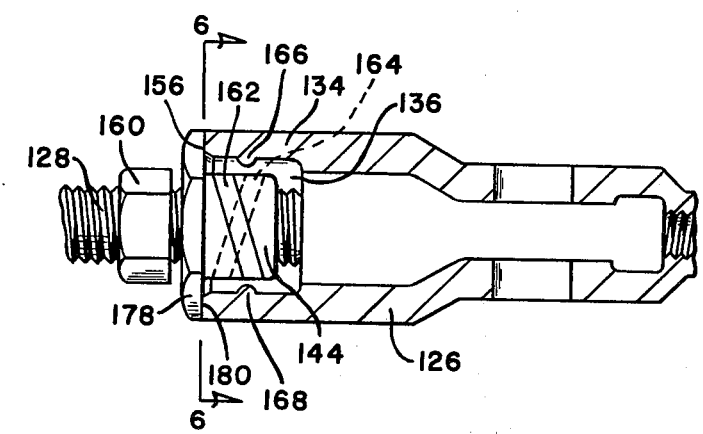
FIG. 5 is a view similar to FIG. 3 but illustrating another embodiment of the invention.
Figure 6:
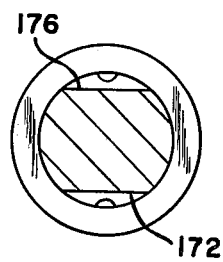
FIG. 6 is a view taken substantially along lines 6—6 of FIG. 5.

Referring now to the embodiment of FIGS. 5 and 6, elements substantially the same as those in the preferred embodiment retain the same reference character, but increased by 100. Referring now to FIGS. 5 and 6, the circumferentially extending groove 48 of the adapter in the preferred embodiment is replaced by a pair of spirally cut grooves 162, 164 and the openings 40, 42 of the preferred embodiment are replaced with a pair of diametrically opposed projections 166, and 168. Diametrically opposed portions of the adapter 144 are provided with flats 172, 176, as best illustrated in FIG. 6. A hex head 178 is integral with the adapter 144, and is adapted to engage the thrust receiving surface 156 of the housing 134. Therefore, when the thrust or push rod 128 is to be installed on the yoke assembly 126, the adapter 144 is installed into the recess 136 with the flats 172, 176 opposite the projection 166, 168, so that the adapter 144 may be installed in the recess 136 in the position illustrated in FIG. 5. The hex head 178 is then rotated one-quarter turn, to thereby engage the projections 166, 168 with their corresponding spirally cut grooves 162, 164. When this is effected, shoulder 180 defined on the hex head 178 will engage the thrust receiving surface 156 on the housing 134, to thereby define the thrust transmitting connection between the push rod 128 and the yoke assembly 126. The nut 160 is then advanced into locking position against the hex head 178.

DETAILED DESCRIPTION OF THE SECOND ALTERNATE EMBODIMENT

Figure 7:
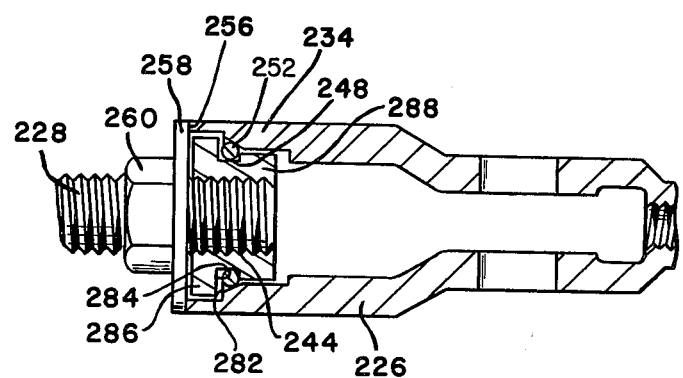
FIG. 7 is a view similar to that of FIGS. 3 and 5, but illustrating still another embodiment of the invention.

Referring now to the embodiment of FIG. 7, elements substantially the same as those in the preferred embodiment retain the same reference character, but increased by 200. Referring now to FIG. 7, the connecting mechanism shown therein is identical to that of the preferred embodiment, except that the inner circumferential surface of the enlarged portion 234 of the yoke assembly 226 is stepped to define larger and smaller diameter portions with a shoulder 282 therebetween. Shoulder 282 defines a second thrust receiving surface, which cooperates with a thrust transmitting surface 284 on the adapter 244. The thrust transmitting surface 284 is defined on a shoulder between larger and smaller diameter portions 286, 288 of the adapter 244. The thrust receiving and transmitting surfaces 282, 284 serve as a back-up for the primary thrust transmitting mechanism defined between the thrust washer 258 and the thrust receiving surface 256. Consequently, if the nut 260 should be inadvertently loosened or should vibrate away from the thrust washer 258 allowing the latter to separate from the thrust receiving surface 256 so that braking thrust can no longer be transmitted therebetween, thrust will be transmitted through the secondary thrust transmitting mechanism defined between the shoulders 284 and 282, thereby preventing failure of the vehicle's brakes, since the U-clip itself cannot withstand the braking thrust transmitted to the yoke 226.

We claim:
1. In a vehicle braking system, a brake actuating lever, a yoke pivotally connected to said lever, a thrust rod, a fluid pressure responsive actuator connected to said thrust rod for urging the latter in a brake application effecting and brake releasing directions and means attaching said yoke to said thrust rod, said yoke including a recess having an entrance through which one end of said thrust rod extends, said attaching means including an adapter movable axially on said thrust rod and located in said recess, first connecting means carried by said yoke and projecting into said recess for engagement with said adapter to define a connection between said yoke and said adapter which does not transmit braking thrust, and second connecting means carried by said thrust rod and cooperating with said yoke to transmit braking thrust to the lever when a brake application is effected, said yoke defining first and second transverse thrust-receiving surfaces circumscribing said thrust rod, said second connecting means including first thrust transmitting means carried by said thrust rod for engagement with the first thrust-receiving surface, and second thrust transmitting means carried by said adapter for engagement with the second thrust-receiving surface.

2. The invention of claim 1:
wherein said first thrust transmitting means includes means movable relative to the thrust rod but lockable in a position to engage said first thrust-receiving surface.

3. The invention of claim 2:
wherein said means movable relative to the thrust rod includes a thrust washer slidable on said thrust rod and a nut locking said thrust washer in place.

4. The invention of claim 2:
wherein said recess is stepped to define larger and smaller diameter portions with a shoulder therebetween, the second thrust receiving surface being defined on said shoulder.

5. The invention of claim 4:
wherein said adapter is stepped to define larger and smaller diameter portions with a shoulder therebetween, said shoulder on the adapter engaging said second thrust receiving surface when braking thrust is transmitted thereto.

6. The invention of claim 5:
wherein engagement of said first thrust transmitting means with said first thrust receiving surface holds said shoulder on the adapter away from said second thrust transmitting surface whereby braking thrust is normally transmitted between said first thrust transmitting means and said first thrust receiving surface but is transmitted from said shoulder on the adapter to the second thrust receiving surface when the first thrust transmitting means is disposed away from the first thrust receiving surface when a brake application is effected.

* * * * *